United States Patent
Suryanarayana et al.

(10) Patent No.: US 11,157,628 B2
(45) Date of Patent: Oct. 26, 2021

(54) METHOD TO TRANSFER FIRMWARE LEVEL SECURITY INDICATORS TO OS LEVEL THREAT PROTECTION TOOLS AT RUNTIME

(71) Applicant: Dell Products L.P., Round Rock, TX (US)

(72) Inventors: Shekar Babu Suryanarayana, Bangalore (IN); Balasingh Ponraj Samuel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 188 days.

(21) Appl. No.: 16/521,835

(22) Filed: Jul. 25, 2019

(65) Prior Publication Data

US 2021/0026967 A1  Jan. 28, 2021

(51) Int. Cl.
  *G06F 21/57* (2013.01)

(52) U.S. Cl.
  CPC .......... *G06F 21/577* (2013.01); *G06F 21/572* (2013.01); *G06F 2221/034* (2013.01)

(58) Field of Classification Search
  CPC .............. G06F 21/577; G06F 21/572; G06F 2221/034; G06F 21/57; G06F 21/575
  See application file for complete search history.

(56) References Cited

U.S. PATENT DOCUMENTS

| 8,869,282 B1* | 10/2014 | Lazarowitz | G06F 21/562 |
| | | | 726/24 |
| 2018/0074884 A1* | 3/2018 | Cady | G06F 11/0787 |
| 2019/0163557 A1* | 5/2019 | Nguyen | G11C 29/883 |
| 2019/0324868 A1* | 10/2019 | Shivanna | G06F 11/1451 |
| 2020/0387611 A1* | 12/2020 | Yao | G06F 21/572 |
| 2021/0064386 A1* | 3/2021 | Bak | G06F 3/0644 |

\* cited by examiner

*Primary Examiner* — Henry Tsang
(74) *Attorney, Agent, or Firm* — Jackson Walker L.L.P.

(57) ABSTRACT

An information handling system may include a processor, a memory coupled to the processor, a storage resource, and a basic input/output system (BIOS). The BIOS may be configured to, while the information handling system is in a pre-boot environment and prior to initialization of an operating system of the information handling system: detect a security vulnerability of the information handling system; and store data regarding the security vulnerability in a portion of the storage resource that is accessible to both the BIOS and the operating system. The information handling system may be further configured to, after the initialization of the operating system, execute a security management service to access, from within the operating system, the data regarding the security vulnerability.

20 Claims, 4 Drawing Sheets

METHOD TO TRANSFER FIRMWARE LEVEL SECURITY INDICATORS TO OS LEVEL THREAT PROTECTION TOOLS AT RUNTIME

TECHNICAL FIELD

The present disclosure relates in general to information handling systems, and more particularly to systems and methods for addressing security issues in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are frequently subject to security vulnerabilities. For example, some types of security vulnerabilities may target flaws in the code of operating systems (OSs) or applications. Other vulnerabilities may target the firmware of an information handling system or of some component thereof. Still other types of vulnerabilities may be based on user behaviors rather than flaws. (For example, a user disabling and then re-enabling a secure boot option in a pre-boot environment may be sufficiently suspicious to be identified as a vulnerability. Likewise, a user flashing a new firmware may also be identified as a vulnerability in some instances.)

There are many existing examples of security vulnerabilities that may be known to one of skill in the art. For example, factorization flaws in Trusted Platform Module (TPM) chips may allow for attacks on RSA private keys. As another example, low level vulnerabilities at the system management mode (SMM) level or even lower (e.g., SMIFlash vulnerabilities, Spectre, Meltdown, SMRAM "cache poisoning" attacks, unlocked compatible/legacy SMRAM, branch outside of SMRAM, etc.) continue to be discovered and exploited.

One problem with existing systems for detecting such security vulnerabilities is that the tools that run in the pre-boot context have not been able to communicate with the tools that run in the operating system context. For example, there has been no existing method for detecting vulnerabilities in a BIOS, on-board diagnostics, and/or device firmware, and making such vulnerabilities known to OS-level tools. Further, there is no existing method for tools that run in the OS context to deploy mitigations in the pre-boot context (e.g., updating a firmware version, etc.).

One example of a security management service that runs in the operating system context is Windows Defender Advanced Threat Protection (ATP). This is an example of a cloud-based security service that enables users to detect, investigate, and respond to threats on their networks. With the use of endpoint behavioral sensors, a tool such as ATP may collect and process behavioral signals from processes, the registry, files, network traffic, the kernel, etc. However, no method is available for collection and processing of behavioral signals at the pre-boot level, nor for integrating such signals into an OS-level tool like ATP. As one of ordinary skill in the art with the benefit of this disclosure will readily understand, similar issues may be present in other operating systems as well.

In general, there is no existing method to dynamically detect the occurrence of a security vulnerability at boot time, determine the type of vulnerability, and report the vulnerability to native OS-level threat protection tools. Further, there is no existing method to converge the risk-based adaptive protection for pre-boot firmware and runtime firmware with native OS-level threat protection tools.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with vulnerability detection in information handling systems may be reduced or eliminated.

In accordance with embodiments of the present disclosure, an information handling system may include a processor, a memory coupled to the processor, a storage resource, and a basic input/output system (BIOS). The BIOS may be configured to, while the information handling system is in a pre-boot environment and prior to initialization of an operating system of the information handling system: detect a security vulnerability of the information handling system; and store data regarding the security vulnerability in a portion of the storage resource that is accessible to both the BIOS and the operating system. The information handling system may be further configured to, after the initialization of the operating system, execute a security management service to access, from within the operating system, the data regarding the security vulnerability.

In accordance with these and other embodiments of the present disclosure, a method may include, while an information handling system is in a pre-boot environment and prior to initialization of an operating system of the information handling system: a basic input/output system (BIOS) of the information handling system detecting a security vulnerability of the information handling system; and the BIOS storing data regarding the security vulnerability in a portion of the storage resource that is accessible to both the BIOS and the operating system. The method may further include, after the initialization of the operating system, a security management service of the information handling system accessing, from within the operating system, the data regarding the security vulnerability.

In accordance with these and other embodiments of the present disclosure, an article of manufacture may include a non-transitory, computer-readable medium having computer-executable code thereon that is executable by a processor of an information handling system for: while the information handling system is in a pre-boot environment and prior to initialization of an operating system of the information handling system: a basic input/output system (BIOS) of the information handling system detecting a security vulnerability of the information handling system; and the BIOS storing data regarding the security vulnerability in a portion of the storage resource that is accessible to both the BIOS and the operating system. The instructions may be further for, after the initialization of the operating system, a security management service of the information handling system accessing, from within the operating system, the data regarding the security vulnerability.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
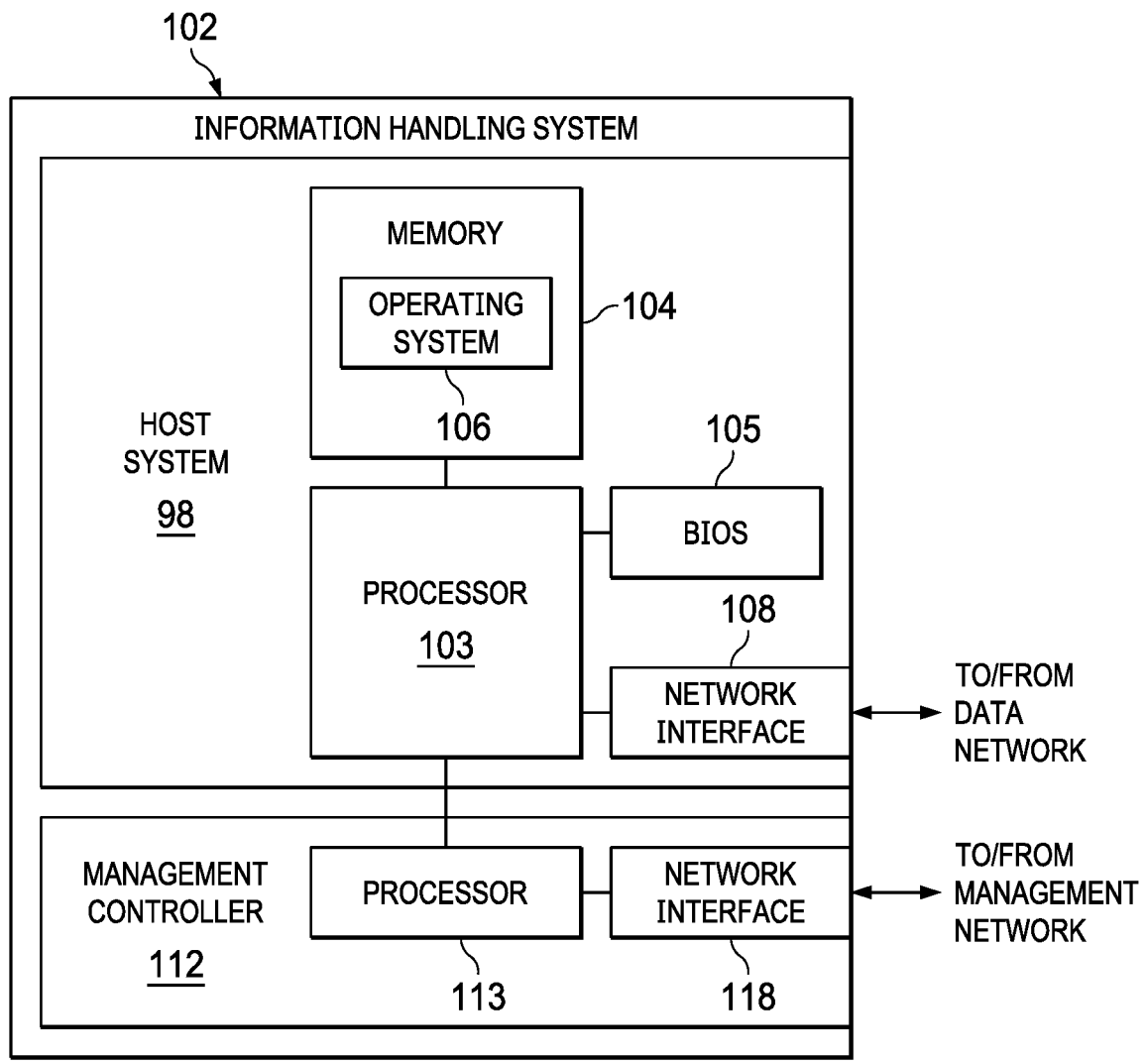
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

In some embodiments, information handling system 102 may include a storage area that is accessible to both of operating system 106 and BIOS 105. For example, such a storage area may be a designated portion of a storage resource such as a hard drive (e.g., a partition). For example, such a partition may be a Globally Unique Identifier Partition Table (GPT) partition, a Master Boot Record (MBR) partition, or any other suitable type of partition. In other embodiments, the storage area may be a portion of a Non-Volatile Memory Express (NVMe) drive (e.g., a namespace). In some embodiments, such a storage area may be accessible via Advanced Configuration and Power Interface (ACPI) runtime services. In some embodiments, once operating system 106 has been initialized (e.g., booted), operating system 106 may access such a storage area via the use of a persistent software agent (also referred to herein as an OS agent) that is configured to communicate with a security management service.

Such an OS agent may in some embodiments comprise any program of executable instructions (or aggregation of programs of executable instructions) configured to execute on operating system 106 as a background service to receive vulnerability information, communicate such information to a security management service, store information in the designated shared storage space, etc., as described in more detail below.

Figure 2:
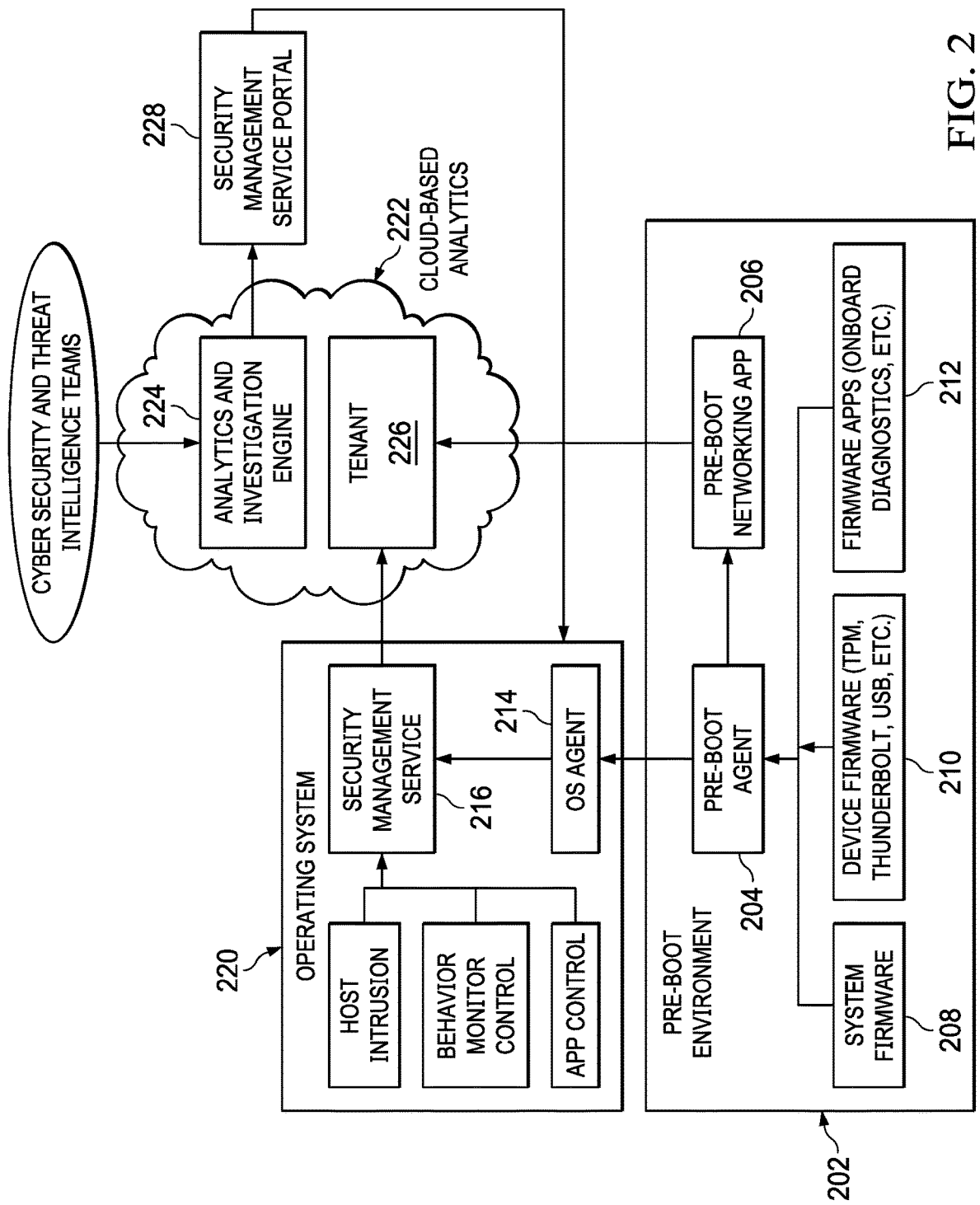
FIG. 2 illustrates a block diagram of an example architecture, in accordance with embodiments of the present disclosure.

Turning now to FIG. 2, a block diagram of an example architecture is shown, in accordance with some embodiments of this disclosure. Within the context of pre-boot environment 202, a pre-boot agent collects information from various sources such as system firmware 208, various device firmware 210, and firmware apps 212. Pre-boot agent 204 may comprise any program of executable instructions (or aggregation of programs of executable instructions) configured to perform various analysis methods to determine whether a security vulnerability is present. One of ordinary skill in the art with the benefit of this disclosure will understand that many techniques may be employed by pre-boot agent 204 to analyze whether or not a vulnerability is present. If a vulnerability is discovered, information regarding such a vulnerability may be passed to an OS agent 214, executing in the context of operating system 220.

OS agent 214 may interface with a security management service 216, which may be an OS-level tool, and which may also collect information about runtime vulnerabilities based on host intrusions, behavior monitoring and control, app control, etc.

Typically, a security management service such as security management service 216 may also be capable of interfacing with cloud-based analytics 222. For example, in embodiments in which security management service 216 comprises Windows Defender ATP, such interfacing may take place via ATP tenant 226. Cloud-based analytics 222 may also provide access to analytics and investigation engine 224 and security management service portal 228. In some embodiments, cloud-based analytics 222 may receive input from one or more remote cyber security and/or threat intelligence teams, as one of ordinary skill in the art with the benefit of this disclosure will understand.

Thus according to some embodiments, OS agent 214 may receive information regarding firmware-level security threats (e.g., information collected and/or generated at the pre-boot phase and/or at runtime) and update OS-level threat protection tools such as security management service 216 via OS agent 214. Additionally, in some embodiments, security vulnerabilities detected at boot time may be directly reported to a remote information handling system via the cloud (e.g., the Internet) by using a pre-boot network connection application. (One example of such a pre-boot network connection application is Dell BIOSConnect.) In these and other embodiments, booting to the OS may be disabled or prevented until the security vulnerability has been mitigated via the pre-boot network connection application. This feature may be advantageous, because allowing the OS to continue booting may expand the attack threat surface for the vulnerability and reduce threat isolation to undesirable levels.

Accordingly, in some embodiments, a smart boot time security scanner may run in a pre-boot environment. Such a scanner may be triggered, for example, by threat score and threat landscape information provided to the pre-boot environment 202 by an OS-level security management service 216. Further, a runtime security inspector may be deployed at runtime and may be configurable via the security management service 216. Still further, an SMM security inspector may also be deployed to provide periodic scanning for security vulnerabilities (e.g., by triggering a soft system management interrupt (SMI)). Still further, automatic vulnerability remedies or mitigations may be implemented, for example by deploying firmware patches and the like via the security management service 216 and/or the pre-boot agent 204.

All of the services mentioned above may be integrated with native OS-level tools such as the security management service to share vulnerability information. For example, vulnerability information may be gathered by scanning through device firmware and correlating information against a vulnerability database (e.g., a CERT database comprising information regarding known vulnerabilities).

Such information, once determined by pre-boot agent 204, may be shared with OS-level tools, for example, by storing it in a portion of a storage resource that is accessible both from the pre-boot environment and from the OS (e.g., a pre-boot GPT partition or NVMe namespace). This portion of the storage resource may be referred to herein as a shared storage location, and it may be exposed to the OS via the use of ACPI runtime services. OS-level tools may further share such information with cloud-level tools to allow for global availability of security indicators, as well as deploying preventative measures (e.g., firmware or software updates).

Figure 3:
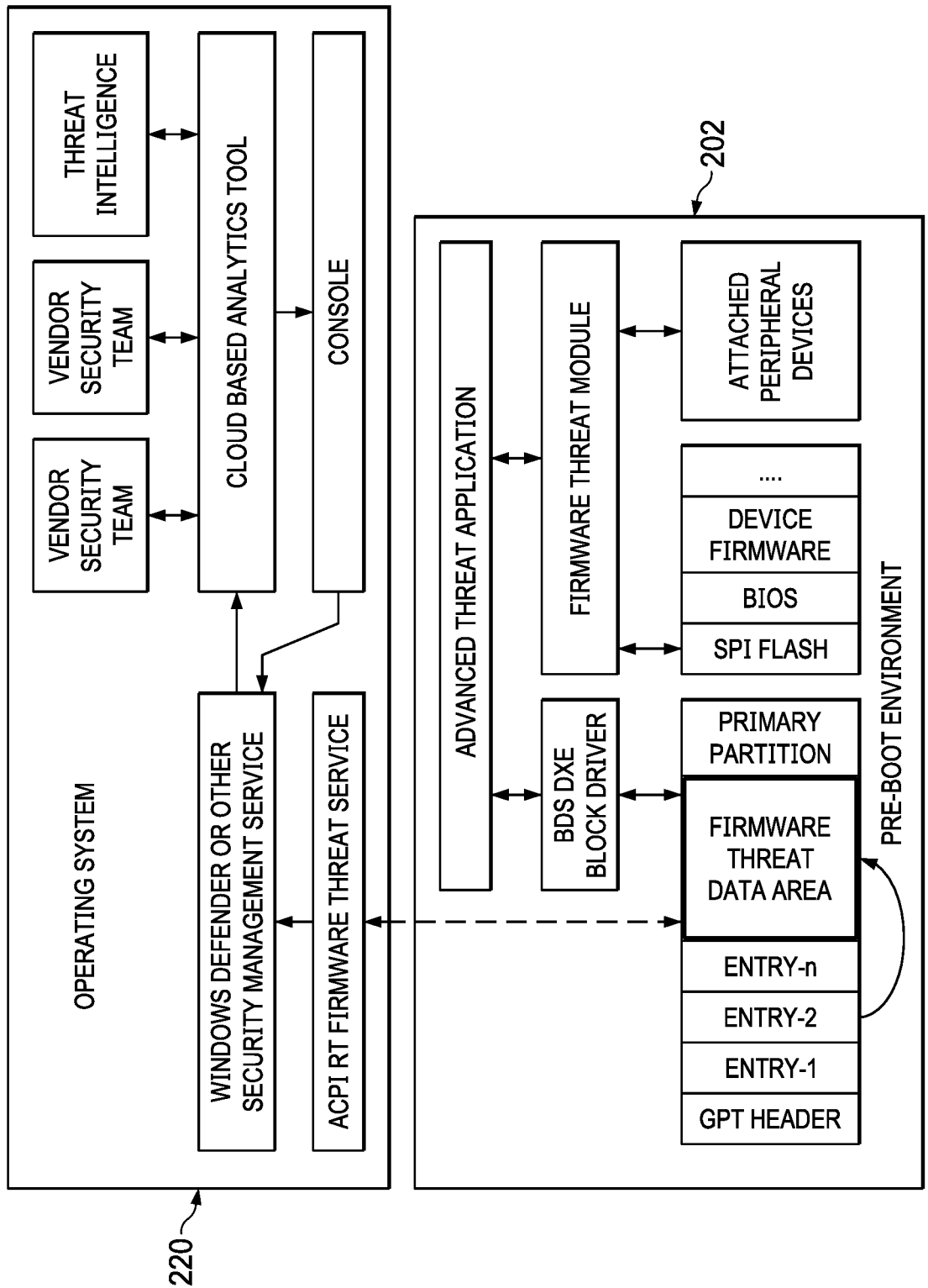
FIG. 3 illustrates a block diagram of an example architecture, in accordance with embodiments of the present disclosure.

Turning now to FIG. 3, a block diagram of an example architecture is shown, according to a first embodiment. As shown, threats may be detected within the pre-boot environment, and information regarding the threats may be stored in a portion of a storage resource that is also accessible by operating system 220 and/or OS-level tools. The storage of this information may be accomplished via the use of a boot device selection (BDS) driver execution environment (DXE) block driver, as shown.

Once operating system 220 has been initialized, an ACPI runtime firmware threat service may provide access to the stored information to an OS-level tool such as Windows Defender or any other security management service. Such a security management service may have an existing console interface that allows it to communicate with a cloud-based analytics tool, receiving up-to-date information from various vendor security teams and threat intelligence.

For example, the security management service may look up the threat data stored in the shared storage location. Once this data is read by the security management service, the security management service may execute various methods (e.g., GET/POST methods) to a respective tenant for behavioral analysis and threat protection actions (e.g., mitigation instructions for reducing or eliminating the vulnerability).

Figure 4:
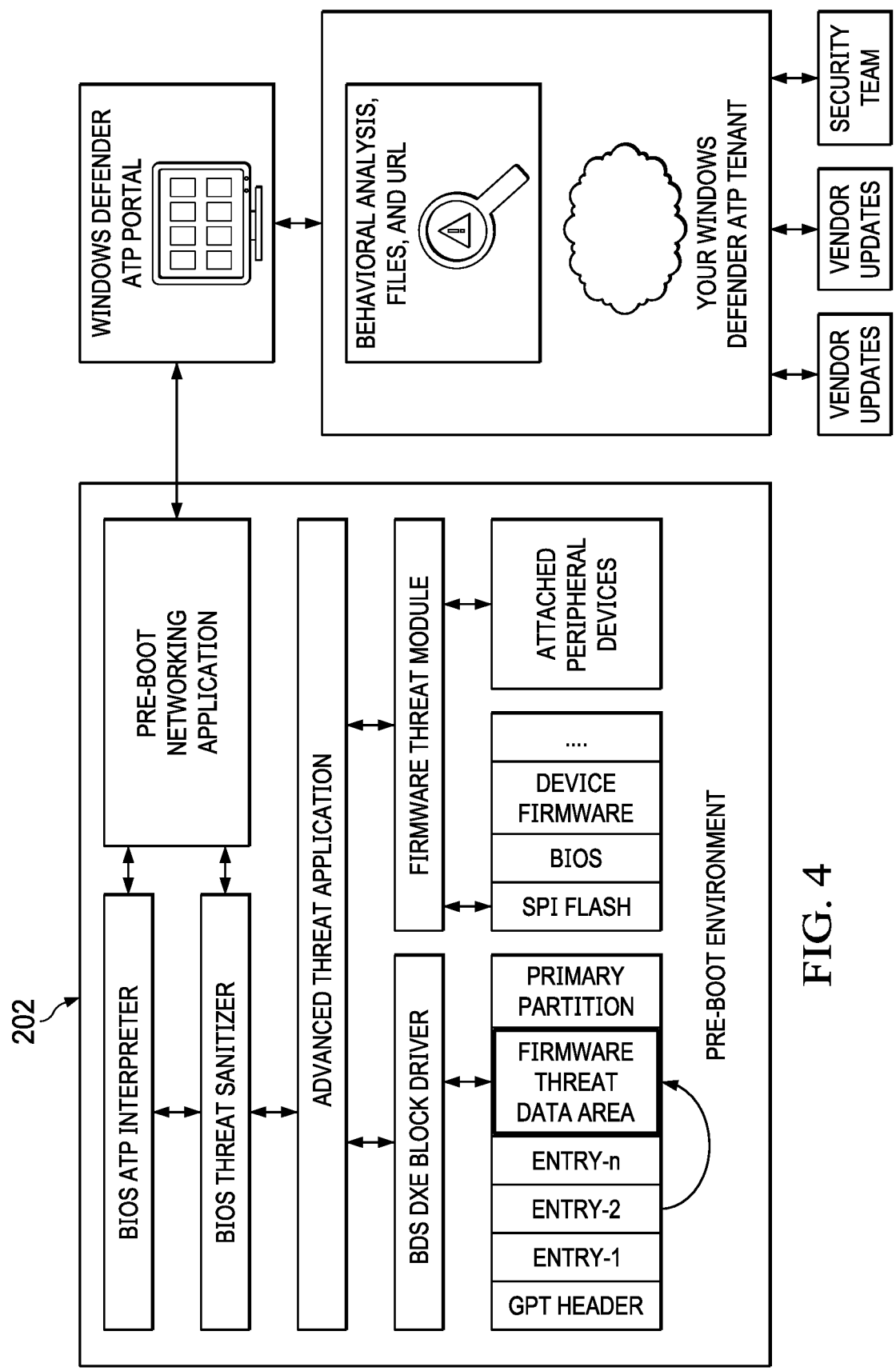
FIG. 4 illustrates a block diagram of an example architecture, in accordance with embodiments of the present disclosure.

Turning now to FIG. 4, a second embodiment is shown. The embodiment of FIG. 4 may be generally similar to that shown in FIG. 3, but with additional elements shown in pre-boot environment 202. Further, for the sake of clarity and exposition, operating system 220 and its associated components are omitted from the view shown in FIG. 4.

In this embodiment, instead of (or in addition to) passing information to an OS-level tool, pre-boot environment 202 may be configured to directly contact a remote information handling system to determine threat sanitization methods. For example, pre-boot environment 202 may include a pre-boot networking application (e.g., Dell BIOSConnect) that is configured to enable such a direct connection.

In some embodiments, pre-boot environment 202 may also prevent the loading of an operating system until after a sufficient threat mitigation has been implemented, reducing an attack surface and providing additional threat mitigation.

Accordingly, various embodiments of this disclosure may provide many advantages. Although various possible advantages have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a processor;
   a memory coupled to the processor;
   a storage resource; and
   a basic input/output system (BIOS) configured to, while the information handling system is in a pre-boot environment and prior to initialization of an operating system of the information handling system:
      receive, from an operating-system-level security management service, threat score information regarding potential security vulnerabilities;
      in response to the threat score information, execute a security scan;
      detect, by the security scan, a security vulnerability of the information handling system; and
      store data regarding the security vulnerability in a portion of the storage resource that is accessible to both the BIOS and the operating system;
   wherein the information handling system is further configured to, after the initialization of the operating system, execute the operating-system-level security management service to access, from within the operating system, the data regarding the security vulnerability.

2. The information handling system of claim 1, wherein the portion of the storage resource is a Globally Unique Identifier Partition Table (GPT) partition.

3. The information handling system of claim 1, wherein the portion of the storage resource is a Non-Volatile Memory Express (NVMe) namespace.

4. The information handling system of claim 1, wherein the BIOS is a Unified Extensible Firmware Interface (UEFI) BIOS.

5. The information handling system of claim 1, wherein the information handling system is further configured to receive, from a remote information handling system, mitigation information for the security vulnerability.

6. The information handling system of claim 5, wherein the information handling system is further configured to implement a mitigation for the security vulnerability based on the mitigation information.

7. The information handling system of claim 6, wherein the mitigation includes deploying a firmware update for at least one information handling resource of the information handling system.

8. The information handling system of claim 1, wherein the operating-system-level security management service is configured to access the data regarding the security vulnerability via Advanced Configuration and Power Interface (ACPI) runtime services.

9. A method comprising:
   while an information handling system is in a pre-boot environment and prior to initialization of an operating system of the information handling system:
      a basic input/output system (BIOS) of the information handling system receiving, from an operating-system-level security management service, threat score information regarding potential security vulnerabilities;
      in response to the threat score information, the BIOS executing a security scan;
      the BIOS detecting a security vulnerability of the information handling system; and
      the BIOS storing data regarding the security vulnerability in a portion of the storage resource that is accessible to both the BIOS and the operating system; and
   after the initialization of the operating system, the operating-system-level security management service of the information handling system accessing, from within the operating system, the data regarding the security vulnerability.

10. The method of claim 9, further comprising receiving, from a remote information handling system, mitigation information for the security vulnerability.

11. The method of claim 9, further comprising the BIOS implementing a mitigation of the security vulnerability prior to the initialization of the operating system.

12. The method of claim 11, further comprising the BIOS preventing the initialization of the operating system until after the implementation of the mitigation.

13. An article of manufacture comprising a non-transitory, computer-readable medium having computer-executable code thereon that is executable by a processor of an information handling system for:
   while the information handling system is in a pre-boot environment and prior to initialization of an operating system of the information handling system:
      a basic input/output system (BIOS) of the information handling system receiving, from an operating-system-level security management service, threat score information regarding potential security vulnerabilities;
      in response to the threat score information, the BIOS executing a security scan;
      the BIOS detecting a security vulnerability of the information handling system; and
      the BIOS storing data regarding the security vulnerability in a portion of the storage resource that is accessible to both the BIOS and the operating system; and
   after the initialization of the operating system, the operating-system-level security management service of the information handling system accessing, from within the operating system, the data regarding the security vulnerability.

14. The article of claim 13, wherein the portion of the storage resource is a Globally Unique Identifier Partition Table (GPT) partition.

15. The article of claim 13, wherein the portion of the storage resource is a Non-Volatile Memory Express (NVMe) namespace.

16. The article of claim 13, wherein the BIOS is a Unified Extensible Firmware Interface (UEFI) BIOS.

17. The article of claim 13, wherein the instructions are further for receiving, from a remote information handling system, mitigation information for the security vulnerability.

18. The article of claim 17, wherein the instructions are further for implementing a mitigation for the security vulnerability based on the mitigation information.

19. The article of claim 18, wherein the mitigation includes deploying a firmware update for at least one information handling resource of the information handling system.

20. The article of claim 13, wherein the operating-system-level security management service is configured to access the data regarding the security vulnerability via Advanced Configuration and Power Interface (ACPI) runtime services.

* * * * *